June 3, 1969  H. SCHWEINFURTH  3,447,671
VIBRATORY WORK MACHINE WITH SHAKEPROOF SUPPORT
Filed June 20, 1966

INVENTOR.
HANS SCHWEINFURTH
BY
ATTORNEYS

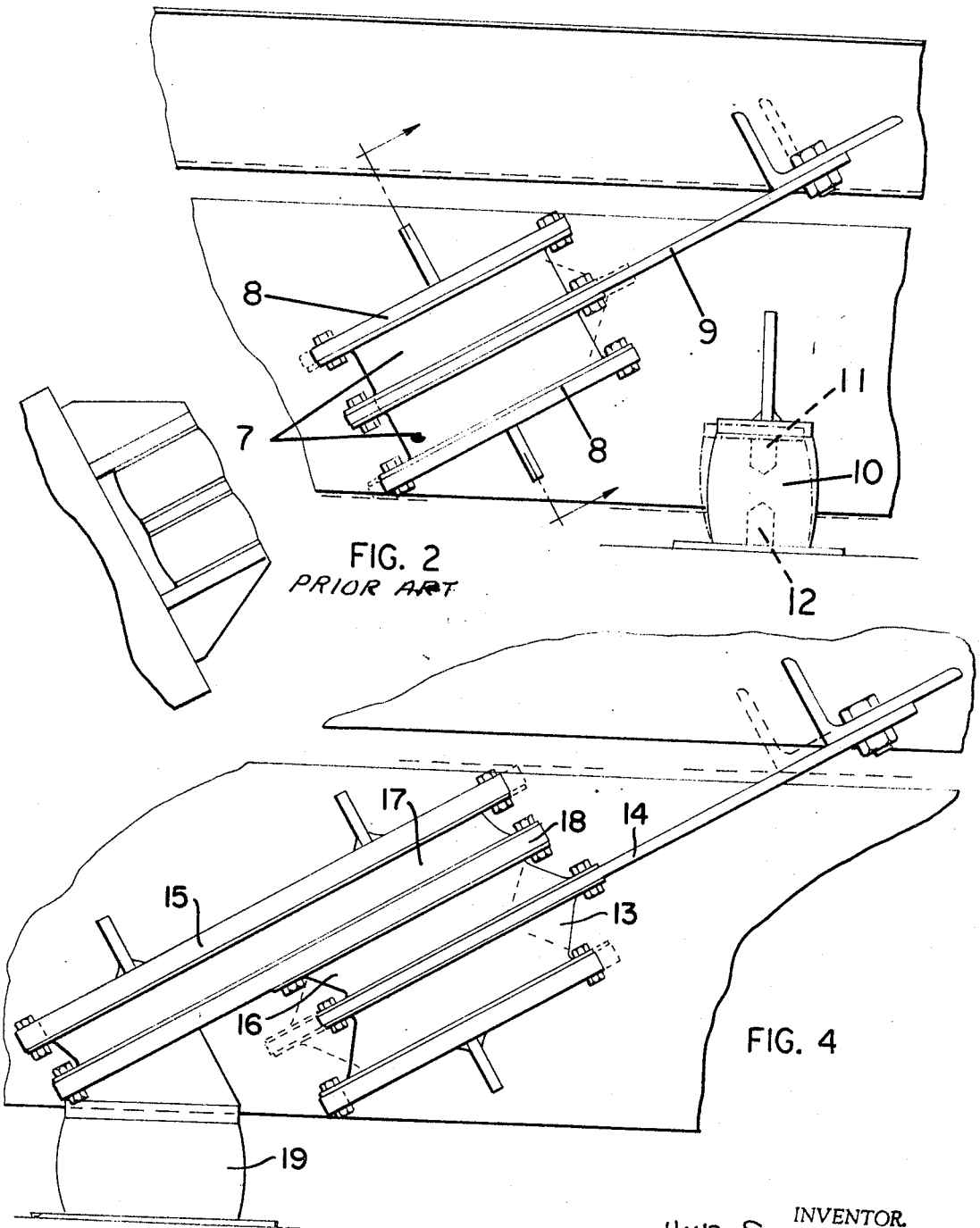

United States Patent Office 3,447,671
Patented June 3, 1969

3,447,671
VIBRATORY WORK MACHINE WITH
SHAKEPROOF SUPPORT
Hans Schweinfurth, 28 Hesterstr.,
58 Hagen-Haspe, Germany
Filed June 20, 1966, Ser. No. 558,836
Int. Cl. B65g 27/08, 27/18
U.S. Cl. 198—220                     3 Claims

ABSTRACT OF THE DISCLOSURE

The invention relates to a vibratory machine for conveying or sieving which comprises a useful mass and a counter mass. The masses are connected by shear rubber springs and are excited by an oscillating drive between the masses. The machine is supported by shear rubber spring means disposed in a plane parallel to the oscillating plane of the drive.

---

It is known that vibratory work machines for conveying and sieving of granular bulk goods can be driven in such a manner that the trough provided for the conveying and sieving, which is also the useful vibratory mass, is excited into linear oscillations, whose oscillating direction is at an angle with respect to the conveyor bottom so that the conveyed material is projected (thrown) at this angle and as a result of these micro-throw-motions continuous conveying occurs. The throw-angle is usually between 20 and 30 degrees for conveyors and between 35 and 45 degrees for sieve machines.

It is further known art to provide such machines with a counter mass (weight) and to arrange the vibratory (oscillatory) drive betwen the useful and counter mass in such a manner that the exciting forces act with equal magnitude but in phase opposition onto both masses. This can be achieved by arranging the main bearing of a crank and connecting rod drive onto the counter mass and the free end of the crank onto the useful mass.

To economize excitation force, it is customary to provide work and storage springs between the two masses of such dimensions that the resonant frequency of the two-mass oscillating system, consisting of useful mass, counter mass and work springs, is equal or approximately equal to the exciting frequency, so that mass and spring forces are approximately equal and thus the drive mechanism has to provide only the forces necessary for overcoming the dampening.

Such a system does not present force action to the outside (does not show a net resultant force towards the outside), as all occurring forces must be regarded as internal forces. In practice, however, it is still necessary to mount the vibrating work machine on a support device for which pressure springs can be provided between machine and support point to achieve this purpose.

These springs are deflected by the vibrating machine and transmit oscillating forces onto the support construction which forces are equal to the product of their stiffness in the direction of oscillation and the amplitude of their deflection.

The above and other objects and advantages of the invention will be readily achieved by the apparatus which will be clearly understood from the following detailed description of an embodiment of the invention considered in the light of the accompanying drawings in which:

FIGURE 2 is a fragmentary view of the customary apparatus for mounting the work and support mechanism of a typical conveying or sieving system;

FIGURE 4 is a fragmentary view of another embodiment of the invention.

Figure 1:
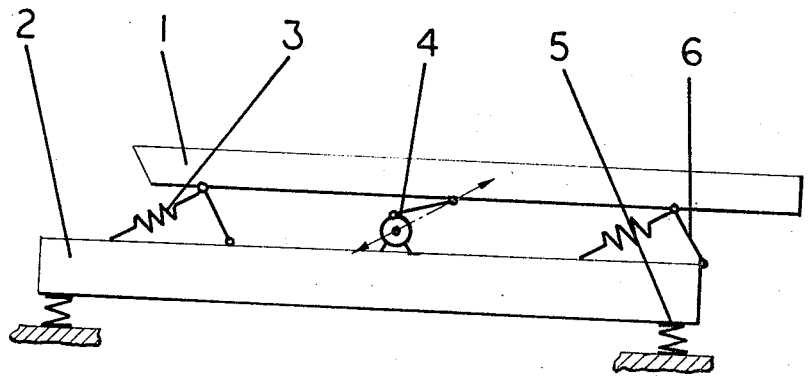
FIGURE 1 is a diagrammatic illustration of the principles employed in the present invention.

In FIGURE 1 there is shown the principle of a vibrating work machine consisting of a useful or working mass 1, a counter mass 2, work springs 3, connecting rod and crank drive 4, and support springs 5. For guidance of the direction of oscillation (vibration) of the useful and counter masses additional guiding links 6 are provided.

In FIGURE 2 there is shown a conventional form of the work and support springs of a system of the type illustrated in FIGURE 1. Rubber shear plates 7 are provided to function as work springs, with two such elements inserted suitably under pressure pre-stressing between a holder 8 affixed to a counter mass and slider section 9 bolted to the useful or working mass. The zero force middle position of the shear springs is drawn with solid lines; and the end position of the oscillation is shown with dashed lines.

FIGURE 2 also shows in center position and at the greatest deflection, a support spring 10 in the shape of a rubber pressure bumper, which is connected to the counter mass and the support surface by a pair of guide pins 11 and 12.

In principle, the support springs 10 could also be fixed to the useful or working mass. As the possible oscillatory amplitudes of connecting rod and crank conveyors, necessary for attaining the conveying speed, lie between 10 and 25 mm., but the oscillation forces of the springs are proportional to the oscillation amplitudes, such an arrangement has to be avoided because of the conclusion (shaking) of the surrounding area.

However, if the support springs 10 are fixed to the counter mass, a substantial reduction of the transmitted vibratory forces is only attained if the weight of the counter mass is chosen to be a multiple of the weight of the useful or working mass, as the oscillation amplitudes of the useful (working) and counter mass are in reciprocal ratio to their weights. It is customary to use mass ratios of 3:1 and higher.

In the dimensioning of the support springs the following difficulties are typically encountered:

On the one hand, good isolation efficiency demands a soft spring (low spring stiffness). On the other hand, the load of the spring is limited by the maximum allowable stresses. With great total weight on account of high mass ratios (counter mass to useful or working mass), the advantage of lower deflection amplitudes is outweighed by the disadvantage of the necessarily greater load surface and thus greater stiffness of the support spring, if the expense for support springs is to remain within reasonable limits.

It is therefore necessary, because of the remaining force to be expected, to limit the oscillation amplitude of the counter mass by limiting the useful oscillation amplitude.

In practice, vibratory conveyors of the described type work with oscillation amplitudes not over 12 to 15 mm. and with mass ratios not below 3:1.

It is also known that given equal oscillation forces, that is, equal oscillatory acceleration, the machine operating with greater amplitude (at higher frequency) will attain higher conveying speeds and therefore higher output than a machine operating with lower amplitude.

It is therefore clear that renouncing high useful oscillation amplitudes in order to keep remaining forces small, is equivalent with a lower overall efficiency of the machine. It has been found that it is possible to construct a vibratory work machine with the highest possible useful vibration amplitude of low total weight and therefore applicable in case of weak support structure, at low cost, if the vibratory work machine constructed of useful mass, chine is transferred into the support springs through a supported in such a manner that the total weight of the machine is transferred into the support springs through a supporting structure which is placed in the deflection-free plane of a part of the rubber shear springs.

Figure 3:
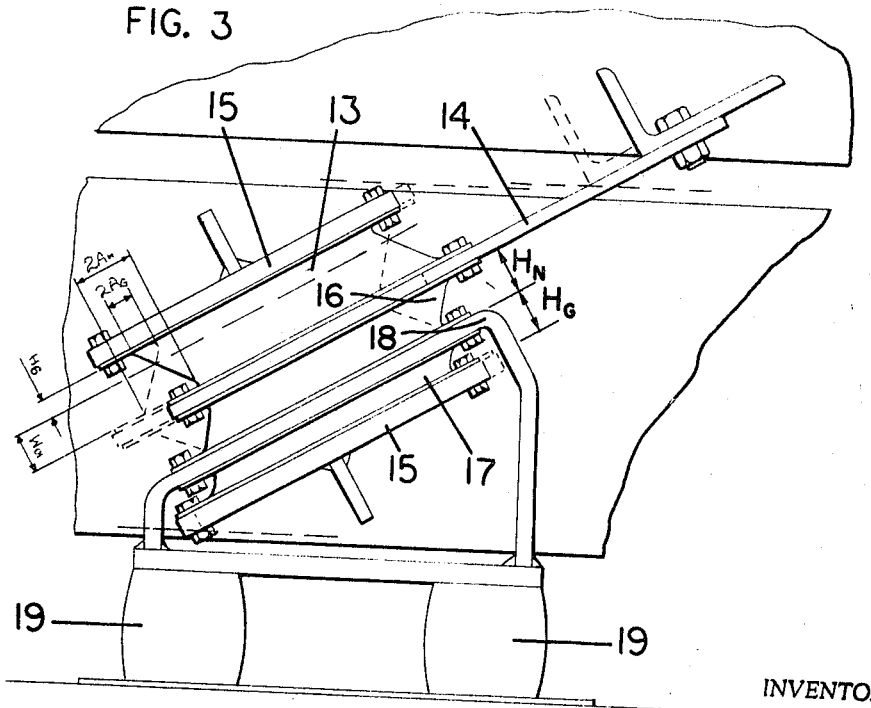
FIGURE 3 is a fragmentary view of a conveying or sieving system embodying the features of the present invention.

In FIGURE 3 there is shown as an example a shear rubber connection in which the upper rubber plate 13 whose shear section to the useful mass 14 and whose holding means onto counter mass 15 essentially corresponds to the conventional connection as illustrated in FIGURE 2. The positions of the respective reversal points of the oscillatory motion are illustrated with the upper position shown in solid lines and the lower position shown in dashed lines.

The deflection-free plane of the upper rubber plate is shown with a dashed line. The position of this plane can be calculated from the ratio of the oscillatory amplitudes.

If $A_G$—Amplitude of counter mass
$A_N$—Amplitude of useful mass
$M_G$—Counter mass
$M_N$—Useful mass and if further $H_N$ and $H_G$ are the partial heights (thickness) of the rubber plate between the deflection-free plane and the connecting surfaces onto the shear section for the useful mass respectively the holding means onto the counter mass, it follows that:

$$\frac{H_N}{H_G}=\frac{A_N}{A_G}=\frac{M_G}{M_N}$$

The lower shear rubber plate 7 of FIGURE 2 is subdivided in FIGURE 3 into two partial springs 16, 17 by an intermediate plate 18 inserted at the height of the deflection-free plane, the latter plate 18, in turn, being supported by support springs 19 for instance, rubber pressure springs.

If the deflection of the intermediate plate 18 is set to theoretical zero, the oscillation forces transmitted by the pressure spring will disappear.

It must however be considered that through the dampening of the conveyed bulk material in the conveyor channel forces become apparent which do not coincide with the direction of shear in the shear rubber springs.

Due to the additional oscillating motions induced by them, these have only small remaining forces acting at the base points of the pressure springs. Although these forces are extremely small in comparison with the compensated mass forces of the machine, it is advisable to mount the intermediate plate 18 on pressure springs, as otherwise these dampening forces would be transmitted in toto through a rigid connection of the intermediate plate to the foundation. However, it is possible that occasionally a rigid connection is to be preferred, as for instance when a stable and vibration resisting foundation is present and also with very long machines which present the danger of bending under resonant frequency oscillations which can be avoided through the connection to the foundation.

Further, it has to be considered that the shear rubber springs are pressure pre-stressed above the intermediate plate by the weight of the machine itself. This pre-stressing is desirable for increasing the allowable shear strength and is provided with all customary rubber shear springs by corresponding static pressure.

The spring stiffness of the partial springs obtained by the above described subdivision can be calculated by the following relations:

The spring stiffness of a rubber spring in the direction of shear $$C=\frac{G \times F}{H}$$

whereby G corresponds to the modulus of elasticity in shear, i.e., a parameter which depends on the kind of material respectively the mixture ratio of the rubber, F means the shear surface of the rubber plate and H the thickness vertically to the shear direction of the rubber plate. If F and G are constant values the spring stiffness of the two partial springs will be related by the following term:

$$\frac{C_G}{C_N}=\frac{H_N}{H_G}=\frac{M_G}{M_N}$$

$C_G$ indicates the spring stiffness of the partial spring (17) arranged between the counter mass and the support, $C_N$ indicates the spring stiffness of the partial spring (16) arranged between the useful mass and the support, $H_G$ and $H_N$ are the individual thicknesses of the partial rubber plates (16, 17) and $M_G$ and $M_N$ are the corresponding masses of the counter mass and the useful mass.

$$\frac{C_G}{C_N}=\frac{M_G}{M_N} \text{ and } \frac{C_G}{C_{total}}=\frac{M_G}{M_{total}}$$

whereby $C_{total}$ corresponds to the spring stiffness of the non-subdivided rubber plate and $M_{total}=M_G+M_N$. By these relations the position of the deflection-free plane respectively the position of the plate 18 can be easily calculated:

$$\frac{C_G}{C_{total}}=\frac{H_{total}}{H_G}$$

and $$\frac{C_N}{C_{total}}=\frac{H_{total}}{H_N}; H_{total}=H_N=H_G$$

As the ratio of the spring stiffness however is the real criterion of the device in accordance with this invention, it is also possible to increase the shear surface of the upper partial spring, if, simultaneously the increase in stiffness caused by such action increase is compensated by a greater rubber height or thickness and therefore the calculated number of the partial spring is maintained.

Such an arrangement is shown in FIGURE 4 and is used whenever at equal shear surfaces, the rubber height or thickness of the thinner partial spring becomes too small.

FIG. 4 will illustrate that according to the mathematical relations $$\left(C=\frac{G \times F}{H}\right)$$

a thin rubber plate can be substituted by a thicker rubber plate (17) if its shear surface will be equally enlarged.

It is of course possible to execute the counter mass, as used in the vibratory machine in accordance with this invention, as a useful device.

Throughout the foregoing description the springs have been referred to as being formed of rubber; it will be understood, however, that satisfactory results may likewise be obtained by forming the springs of other elastomeric materials.

What I claim is:

1. A vibratory machine for conveying or sieving comprising one useful mass and one counter mass which are connected to each other by shear rubber springs and which are excited by an oscillating drive placed between the two masses where the linear exciting forces for both masses are substantially larger and of opposite phase, a support for said vibratory machine, said support being formed of a supporting construction containing at least one subdivided shear rubber spring means, said spring means disposed in a plane parallel to the oscillatory plane of said oscillating drive, said spring means being divided into at least two partial springs, so that the ratio of shear spring stiffness of the partial springs, arranged between said counter mass and said support and between said useful mass and said support is the same as the ratio between said counter mass and said useful mass.

2. A vibratory machine as defined in claim 1 wherein said support is rigidly connected to a foundation.

3. A vibratory machine as defined in claim 2 wherein said support is connected to said foundation through relatively soft support spring means.

References Cited

UNITED STATES PATENTS

| | | | |
|---|---|---|---|
| 2,729,332 | 1/1956 | Gruner | 209—415 X |
| 3,058,577 | 10/1962 | Musschoot | 209—415 X |

FOREIGN PATENTS

| | | |
|---|---|---|
| 1,091,034 | 10/1960 | Germany. |
| 982,531 | 6/1961 | Great Britain. |

ROY D. FRAZIER, *Primary Examiner.*

J. F. FOSS, *Assistant Examiner.*

U.S. Cl. X.R.

209—365; 248—22